US009095830B2

(12) United States Patent
Vetter et al.

(10) Patent No.: US 9,095,830 B2

(45) Date of Patent: Aug. 4, 2015

(54) LOUVER FRONT FACED INLET DUCTS

(75) Inventors: Michael J. Vetter, Schaumburg, IL (US); Paul A. Sechrist, South Barrington, IL (US); Bryan K. Glover, Algonquin, IL (US)

(73) Assignee: UOP LLC, Des Plaines, IL (US)

( * ) Notice: Subject to any disclaimer, the term of this patent is extended or adjusted under 35 U.S.C. 154(b) by 1322 days.

(21) Appl. No.: 12/910,070

(22) Filed: Oct. 22, 2010

(65) Prior Publication Data

US 2011/0036427 A1 Feb. 17, 2011

Related U.S. Application Data

(62) Division of application No. 11/743,904, filed on May 3, 2007, now Pat. No. 7,846,403.

(51) Int. Cl.

| | |
|---|---|
| ***B01J 8/00*** | (2006.01) |
| ***B01J 8/12*** | (2006.01) |
| ***B01J 8/02*** | (2006.01) |
| ***F26B 17/12*** | (2006.01) |
| ***B01J 8/08*** | (2006.01) |

(52) U.S. Cl.

CPC ................ *B01J 8/0278* (2013.01); *B01J 8/008* (2013.01); *B01J 8/085* (2013.01); *B01J 8/12* (2013.01); *F26B 17/126* (2013.01); *B01J 2208/0084* (2013.01); *B01J 2208/0092* (2013.01); *B01J 2208/00548* (2013.01); *B01J 2208/00884* (2013.01); *B01J 2208/00929* (2013.01)

(58) Field of Classification Search

CPC ............... B01J 2208/0092; B01J 2208/00929; F26B 17/122; F26B 17/124; F26B 17/126

See application file for complete search history.

(56) References Cited

U.S. PATENT DOCUMENTS

| | | | | |
|---|---|---|---|---|
| 676,681 | A * | 6/1901 | Mallinson | 34/171 |
| 1,522,480 | A * | 1/1925 | Allen | 95/112 |
| 3,912,466 | A * | 10/1975 | Zenz | 95/276 |
| 5,356,462 | A * | 10/1994 | Bruggendick | 96/150 |
| 7,226,568 | B1 * | 6/2007 | Ham et al. | 422/218 |

FOREIGN PATENT DOCUMENTS

GB 2255629 A * 11/1992

* cited by examiner

*Primary Examiner* — Jennifer A Leung

(57) ABSTRACT

An apparatus is for directing a fluid into a radial reactor is and which maintains a bed of solid particulate material within a reactor. The apparatus comprises a duct for directing fluid into a reactor and has a screenless face for the egress of the fluid, while providing for the retention of solid particles.

8 Claims, 3 Drawing Sheets

LOUVER FRONT FACED INLET DUCTS

CROSS-REFERENCE TO RELATED APPLICATION

This application is a Division of copending Application Ser. No. 11/743,904 filed May 3, 2007, the contents of which are hereby incorporated by reference in its entirety.

FIELD OF THE INVENTION

This invention relates generally to the contacting of fluids and solid materials. Specifically, this invention relates to the internals of reactors used in the contact of fluids and solid particles with respect to conduit design for the radial flow of fluids in fluid solid contacting.

BACKGROUND OF THE INVENTION

A wide variety of processes use radial flow reactors to provide for contact between a fluid and a solid. The solid usually comprises a catalytic material on which the fluid reacts to form a product. The processes cover a range of processes, including hydrocarbon conversion, gas treatment, and adsorption for separation.

Radial flow reactors are constructed such that the reactor has an annular structure and that there are annular distribution and collection devices. The devices for distribution and collection incorporate some type of screened surface. The screened surface is for holding catalyst beds in place and for aiding in the distribution of pressure over the surface of the reactor to facilitate radial flow through the reactor bed. The screen can be a mesh, either wire or other material, or a punched plate. For a moving bed, the screen or mesh provides a barrier to prevent the loss of solid catalyst particles while allowing fluid to flow through the bed. Solid catalyst particles are added at the top, and flow through the apparatus and removed at the bottom, while passing through a screened-in enclosure that permits the flow of fluid over the catalyst. The screen is preferably constructed of a non-reactive material, but in reality the screen often undergoes some reaction through corrosion, and over time problems arise from the corroded screen or mesh.

One type of inlet distribution device is a reactor internal having a scallop shape and is described in U.S. Pat. No. 6,224,838 and U.S. Pat. No. 5,366,704. The scallop shape and design provides for good distribution of gas for the inlet of a radial flow reactor, but uses screens or meshes to prevent the passage of solids. The scallop shape is convenient because it allows for easy placement in a reactor without concern regarding the curvature of the vessel wall. The screens or meshes used to hold the catalyst particles within a bed are sized to have apertures sufficiently small that the particles cannot pass through. A current inlet duct design, OptiMiser™ by United States Filter Corp., WO 01/66239 A2, has an improved shape, but still uses a screen comprised of wires having a sufficiently narrow spacing to prevent the passage of catalyst. A significant problem is the corrosion of meshes or screens used to hold catalyst beds in place, or for the distribution of reactants through a reactor bed. Corrosion can plug apertures to a screen or mesh, creating dead volumes where fluid does not flow. Corrosion can also create larger apertures where the catalyst particles can then flow out of the catalyst bed with the fluid and be lost to the process increasing costs. This produces unacceptable losses of catalyst, and increases costs because of the need to add additional makeup catalyst.

The design of reactors to overcome these limitations can save significantly on downtime for repairs and on the loss of catalyst, which is a significant portion of the cost of processing hydrocarbons.

SUMMARY OF THE INVENTION

The present invention provides for a new screenless inlet duct for the flow of fluid into a radial reactor. The invention comprises an inlet flow duct that is vertically oriented when disposed within a radial reactor. The duct comprises a front face oriented toward the catalyst bed, two side faces, and a rear face oriented toward the exterior wall of a radial reactor. The front face comprises a plate having apertures defined therein, and louvers that are affixed to the front face. The louvers have a leading edge and a trailing edge, where the leading edge is affixed to the front face at a position above the apertures, and the trailing edge extends away from the front face and in a downward direction.

In one embodiment, the invention comprises a new radial reactor that uses the screenless inlet ducts, where the screenless inlet ducts are arrayed in a circumferential manner around the inside of the reactor housing exterior wall.

Other objects, advantages and applications of the present invention will become apparent to those skilled in the art from the following drawings and detailed description.

DETAILED DESCRIPTION OF THE INVENTION

A problem exists with radial flow reactors where a catalyst flows down an annular region, and the annular region is defined by an inner screened partition and an outer screened partition, which defines the catalyst bed, or a particle retention volume for holding a granular solid. In a typical radial reactor, a fluid, usually a gas, flows into an annular region surrounding the reactor, flows across the partitions and catalyst bed, and exits into a centerpipe where the resulting effluent is withdrawn. The fluid reacting with the catalyst to produce a product fluid, also usually a gas. The reactor holds the catalyst in with screens where the gas flows through. The partitions need holes sufficiently small to prevent catalyst particles from passing, but the holes are subject to plugging and creating dead spaces where the gas doesn't flow, as well as the partitions are subject to erosion and corrosion, creating holes that allow for catalyst to spill out.

Figure 1:
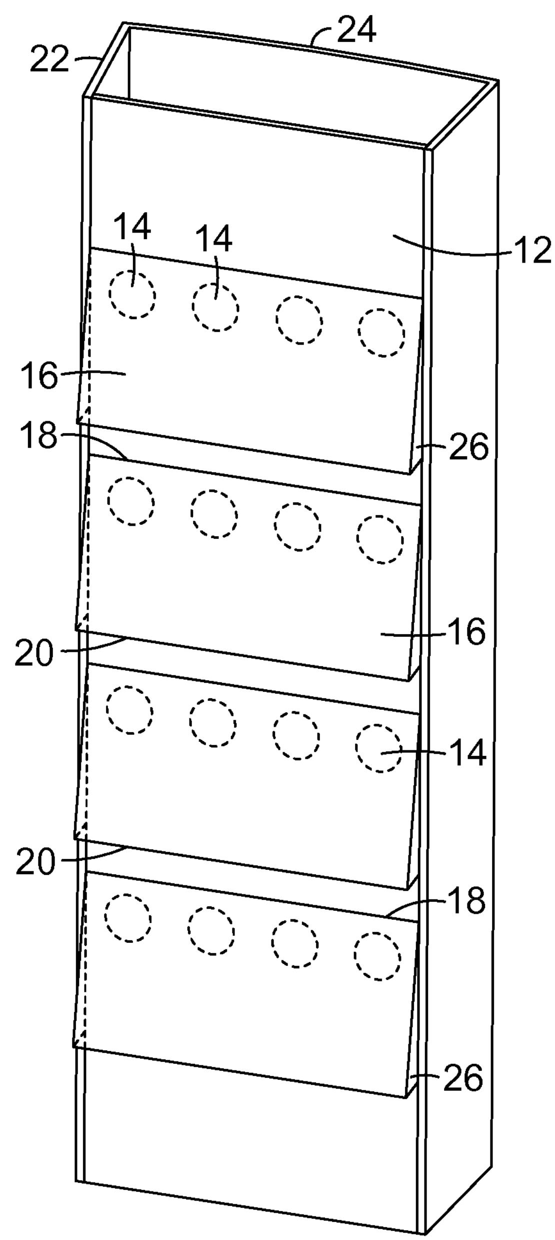
FIG. 1 is a diagram of a louvered inlet duct.
Figure 2:
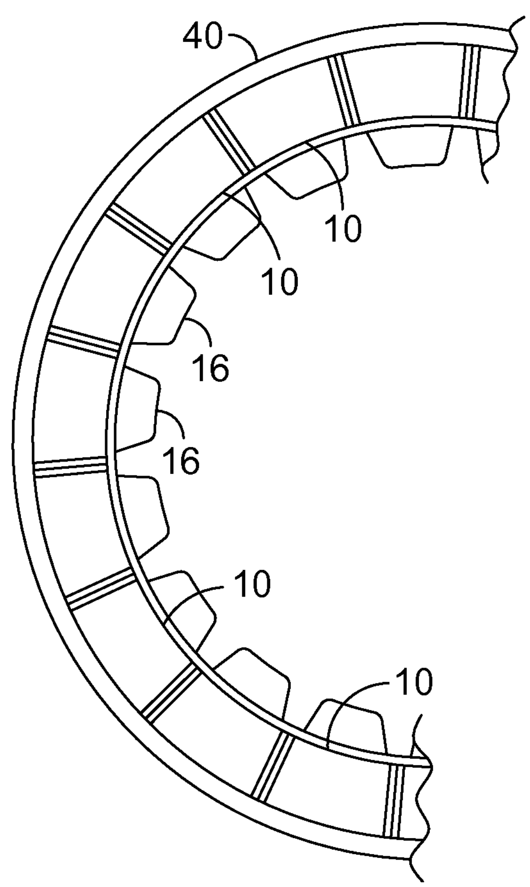
FIG. 2 is a diagram of the louvered inlet ducts arrayed around the inside of a reactor housing.

The inlet annular region comprises a series of channels for directing the fluid into the reactor. The channels comprise vertically elongated ducts where each duct has a front face, two side faces, and a rear face. The duct, as shown in FIG. 1, has a substantially trapezoidal cross-section, such that when the ducts are arrayed in a cylindrical reactor housing, as shown in FIG. 2, the ducts form a toroidal structure with the rear faces of the ducts facing the reactor housing 40, and the front faces of the ducts facing a reaction zone that holds the catalyst bed. The front face 12 of the duct 10 comprises a plate with apertures 14 defined therein. The apertures 14 are spaced over the front face 12 to provide for a uniform distribution of inlet fluids to the catalyst in the reaction zone. The apertures 14 are covered with louvers 16 to prevent the flow of catalyst through the apertures 14. The louvers 16 have a leading edge 18 affixed to the front face 12 and a trailing edge 20 extending away from the front face 12 and into the zone for containing catalyst. For purposes of this invention, the terms leading edge 18 and trailing edge 20 are with respect to the flow of solid particles through the reactor. The leading edge 18 is the upstream edge with respect to the direction of flow of the solid particles, and the trailing edge 20 is the downstream edge. The particles flow through the reactor, and particles flowing along the front face 12 will contact the leading edge 18 first, flow along the louver 16 and contact the trailing edge 20.

This design reduces fouling tendencies and problems associated with corrosion, such as plugging, or destruction of the mesh that lets catalyst through the face of the inlet duct. The apertures 14 are sized sufficiently large to provide a free flow of fluid through the apertures 14, and preferably are substantially larger than the size of the catalyst particles in the reactor. The front face 12 with apertures 14 can be fabricated according to any method known to those skilled in the art, include drilling holes or punching holes. The invention also reduces the pressure drop across the front face of the inlet duct.

The louvers 16 are disposed at an angle between 1° and 89° from vertical, where an angle of 0° means the louvers 16 would lay flat along the surface of the front face 12, and an angle of 90° means the louvers 16 would be oriented perpendicularly to the front face 12. However, the greater the angle, the greater the chance of creating a hold up of the catalyst, and an angle greater than 60° would present potential problems with catalyst hold up. It is preferred that the louvers 16 are oriented at an angle between 10° and 30° from vertical. The angle, as used herein is the angle formed by the louver 16 with the front face 12 of the duct.

In one embodiment, the louvers 16 have a length defined as the distance between the leading edge 18 and the trailing edge 20 of the louver 16. The apertures 14 in the front face 12 have an upper edge and a lower edge, where the upper edge is the point on the aperture that is highest on the front face 12, and the lower edge is the point on the aperture that is lowest on the front face 12, where the duct 10 is oriented in a vertical direction. A louver 16 in the present embodiment extends to a distance of at least the lower edge of the apertures that it covers. In a preferred embodiment, the length of the louvers 16 is sufficient to have the louver trailing edge 20 extend a distance below the aperture lower edge equal to the distance of the gap between the louver 16 and the front face 12.

In another embodiment, the louvers 16 have side edges, and the louvers 16 further comprises extensions 26, where each extension 26 is affixed to one edge of the louver 16 and to the front face, forming an awning like structure over the apertures 14.

The structure of the ducts 10 have a substantially trapezoidal cross-section. When the ducts 10 are arrayed around the inside of the reactor housing 40, the side faces 22 would lie on radial lines that go from the center of the reactor housing 40 to the reactor housing walls. In one embodiment, the front face 12 and the rear face 24 are substantially flat surfaces, with the front face 12 comprising a surface with apertures 14. This provides for convenient construction of the ducts 10, where the louvers 16 are affixed to the front face 12 after the apertures 14 are made. In fabricating the ducts 10, the louvers 16 can be affixed to the front face 12 before attachment to the side faces 22, or the louvers 16 can be affixed to the front face 12 after the front face 12 is attached to the side faces 22. The side faces 22 and the rear face 24 can be fabricated from a single sheet of metal formed into an open box before the attachment of the front face 12.

In one embodiment, the ducts 10 have a substantially trapezoidal cross-section as described above, but with the front face 12 and the rear face 24 having a curvature to equal the radius of curvature of a circle with the circle's center at the center of the reactor housing 40 and the radius equal to the distance of each face from the center. A variation on these two embodiments is that one of either the front face 12 or rear face 24 is curved.

In another embodiment, the ducts 10 have a substantially rectangular cross-section. The creates a small gap between adjacent ducts 10, with the front faces 12 touching the edges of neighboring front faces 12. By fabricating the ducts 10 with substantially rectangular cross-sections, the ducts are more easily fabricated and provide for room fitting the ducts into the reactor housing 40. In addition, the ducts 10 can be placed within the reactor housing 40 with a small gap between the ducts 10, and a covering plate (not shown) can be placed over the gap to prevent the catalyst from entering the space between the ducts 10. In a variation of the covering plates, the ducts 10 can be fabricated with overlaying flange portions (not shown). The flange portions would be attached to only one side of the duct 10, such that when the ducts 10 are positioned inside the reactor housing 40 a flange portion will cover an edge of the front face 12 of a neighboring duct 10. The use of overlaying flange portions allows for room to fit the ducts 10 within the reactor housing 40 without requiring an exact fit with no room for thermal expansion and contraction of the ducts 10 during any heating and cooling cycles of the reactor.

In another embodiment, the ducts 10 have a substantially trapezoidal cross-section, and the ducts 10 are as described above. However, the trapezoidal cross-section is such that the width of the front face 12 is greater than the width of the rear face 24. This embodiment creates void spaces between neighboring ducts 10, and requires the use of a covering plate to cover any gap between neighboring front faces 12, or the use of an overlaying flange portion with each duct 10 to cover any gap. The covering plate or flange portion prevent the movement of catalyst particles into the void spaces between the neighboring ducts 10.

A further feature that can be included in the ducts 10 include support bars, disposed within the duct 10, or on the exterior of the ducts 10 that provide structural rigidity to the ducts.

In one embodiment, the invention comprises an improved radial flow apparatus. The apparatus can be an adsorber, a reactor, or any operations unit requiring radial flow. The apparatus comprises a vertically oriented and substantially cylindrical vessel having a fluid inlet and a fluid outlet. Inside the apparatus, a vertically oriented centerpipe is disposed within the vessel and is located substantially in the center of the cylindrical vessel. The center pipe can be either a fluid inlet or a fluid outlet, where the wall of the centerpipe include openings, or apertures, for the fluid to pass through the wall of the centerpipe. The apparatus further includes a plurality of vertical ducts arranged circumferentially around the cylindrical vessel, and along the inside of the cylindrical vessel wall. The ducts have a transverse cross-section having a substantially trapezoidal or rectangular shape. The ducts have a front face facing toward the centerpipe, a rear face facing the inside surface of the cylindrical vessel wall, and in contact with the vessel wall, and two side faces connecting the front face to the rear face. The front face further includes apertures defined therein to allow for the flow of fluid across the front face. The apertures are covered by a louver that prevents catalyst particles flowing through the reactor from passing through the apertures in the front face of the ducts. The ducts with the louvers are as described above.

The ducts are separated from the centerpipe to define a space for holding solid particles, and in a particular embodiment, the solid particles are catalyst particles.

The apparatus provides for a fluid that is flowing into the apparatus to be directed into the vertically arrayed ducts. The fluid flows down the ducts and through the apertures in the front face, then across the solid particle, or catalyst, bed to the centerpipe. The fluid flows through the openings in the centerpipe, and is carried out of the apparatus.

Figure 3:
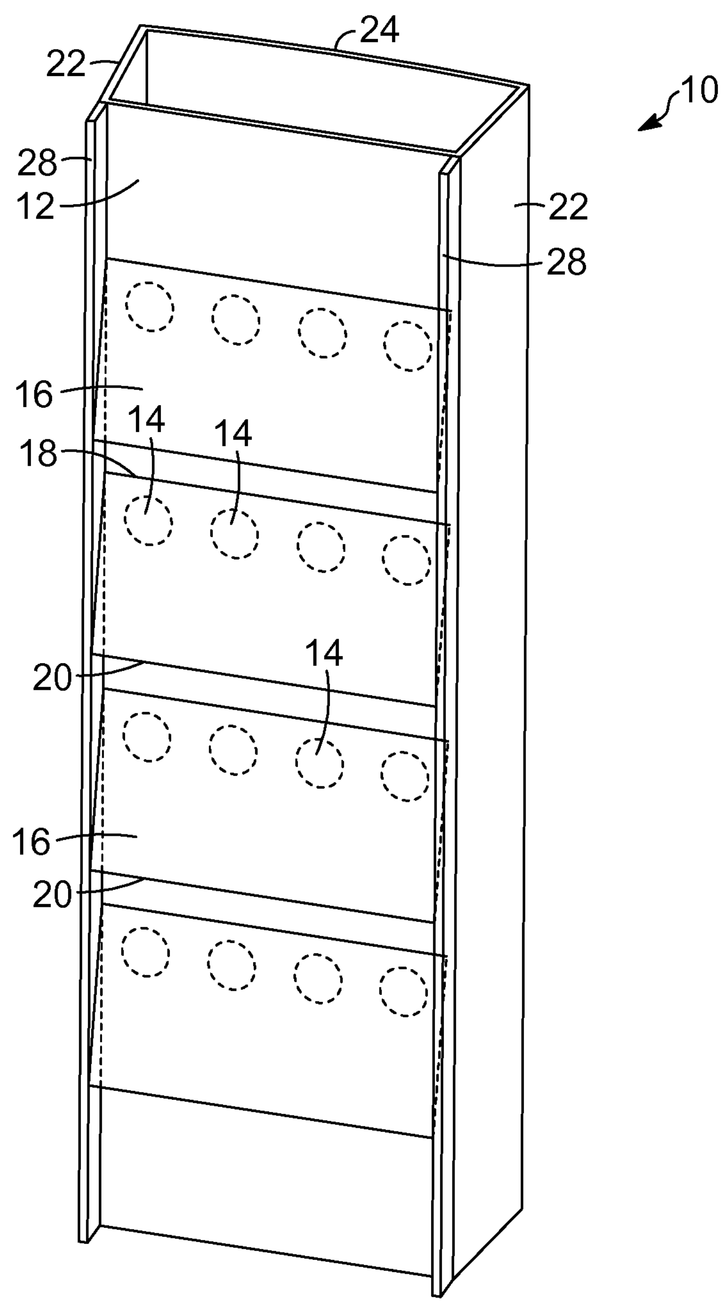
FIG. 3 is a diagram of a recessed embodiment of the invention.

In one embodiment, the improved inlet flow devices comprise a recessed front face as shown in FIG. 3. The apparatus comprises a vertically elongated inlet duct 10 having a front face 12, two side faces 22, and a rear face 24. The front face 12 is disposed between the two side faces 22 and recessed from the edges 28 of the side faces 22. The front face 12 has apertures 14 defined in the front face 12, where fluid entering the duct 10 can exit through the apertures 14 and flow across a reactor volume. Affixed to the front face 12 are a plurality of louvers 16 extending outwardly from the front face 12. The louvers 16 have a leading edge 18 affixed to the front face 12 at a position above at least one aperture 14, and the trailing edge 20 extending away from the front face 12 and in a downward direction. The louvers 16 extend across the front face 12 from one side face 22 to the other side face 22, and are affixed to the side faces 22 along the edge of the louvers 16. The louvers 16 extend away from the front face 12 at an angle between 1° and 89° from vertical, and preferably at an angle between 10° and 30° from vertical. The recessed front face design allows for convenient insertion of the apparatus in existing cross-flow reactors, where the reactors might have screens, but the screens have corrosion or erosion problems and would normally need to be replaced. The use of this invention obviates the need for replacing corroded screens and allows for bringing a reactor on line faster.

While the invention has been described with what are presently considered the preferred embodiments, it is to be understood that the invention is not limited to the disclosed embodiments, but it is intended to cover various modifications and equivalent arrangements included within the scope of the appended claims.

The invention claimed is:

1. An improved radial flow apparatus comprising:

a vertically oriented, substantially cylindrical vessel having a fluid inlet and a fluid outlet;

a vertically oriented center pipe disposed within the vessel and having a fluid inlet and a fluid outlet, where either the fluid inlet or fluid outlet comprises apertures in the center pipe wall; and a plurality of vertical outer ducts arranged circumferentially around the interior of the vessel wall, each outer duct comprising a front face, two side faces, and a rear face, wherein the front face is recessed at a depth between the two side faces, and the front face comprises a louvered structure comprising a plate having apertures defined therein and louvers extending outward from the front face, and where the louvers have a leading edge and a trailing edge and where the louver leading edge is affixed to the plate at a position above at least one aperture, and the louver trailing edge extends away from the plate and in a downward direction and to a distance away from the front face less than or equal to the depth of the recess where a particle retention volume is defined by the space between front faces of the ducts and the wall of the center pipe.

2. The apparatus of claim 1 wherein the rear face and side faces of the outer ducts are non-perforated surfaces.

3. The apparatus of claim 1 where the fluid inlet communicates with the interior of the outer ducts and the center pipe communicates with the fluid outlet to create a radially inward fluid flow path through the particle retention volume.

4. The apparatus of claim 1 where the louvers are disposed at an angle between 10° and 30° from vertical.

5. The apparatus of claim 1 where the apertures have side edges, the louvers have side edges, and the apparatus further comprises a pair of extensions, wherein each extension is affixed to one edge of the louver and the front face.

6. The apparatus of claim 1 further comprising an inlet for solid particles and an outlet for solid particles, wherein the inlet and outlet are in fluid communication with the particle retention volume.

7. The apparatus of claim 1 wherein the vertical outer ducts have a transverse cross-section having a substantially trapezoidal shape.

8. The apparatus of claim 1 wherein the vertical outer ducts have a transverse cross-section having a substantially rectangular shape.

* * * * *